(12) United States Patent
Shingler (10) Patent No.: US 11,589,422 B2
(45) Date of Patent: Feb. 21, 2023

(54) COOKING SYSTEM WITH MULTIPLE HEATING ELEMENTS

(71) Applicant: EVO AMERICA, LLC, Tualatin, OR (US)

(72) Inventor: Robert A. Shingler, Beaverton, OR (US)

(73) Assignee: EVO AMERICA, LLC, Tualatin, OR (US)

( * ) Notice: Subject to any disclaimer, the term of this patent is extended or adjusted under 35 U.S.C. 154(b) by 0 days.

(21) Appl. No.: 15/421,316

(22) Filed: Jan. 31, 2017

(65) Prior Publication Data
US 2017/0223772 A1    Aug. 3, 2017

Related U.S. Application Data

(60) Provisional application No. 62/289,756, filed on Feb. 1, 2016.

(51) Int. Cl.
*H05B 1/02* (2006.01)
*F24C 7/06* (2006.01)
(Continued)

(52) U.S. Cl.
CPC ............ *H05B 1/0266* (2013.01); *A47J 36/32* (2013.01); *A47J 37/067* (2013.01); *F24C 7/067* (2013.01);
(Continued)

(58) Field of Classification Search
CPC ........ H05B 1/0266; F24C 7/067; F24C 7/083; F24C 15/105
(Continued)

(56) References Cited

U.S. PATENT DOCUMENTS 3,235,709 A * 2/1966 Fischer ................. F24C 15/106
219/448.15
3,646,321 A * 2/1972 Siegla ................... F24C 15/102
219/465.1
(Continued)

FOREIGN PATENT DOCUMENTS

DE   102007018085 A1   10/2008
EP      0866641 A2    9/1998
(Continued)

OTHER PUBLICATIONS

ISA Korean Intellectual Property Office, International Search Report Issued in PCT Application No. PCT/US2017/015896, dated Apr. 25, 2017, WIPO, 3 pages.
(Continued)

*Primary Examiner* — Erin E McGrath
(74) *Attorney, Agent, or Firm* — Alleman Hall Creasman & Tuttle LLP (57) ABSTRACT

Examples are disclosed herein that relate to a cooking system having multiple heating elements for heating a cooking surface. One example provides a cooking system, comprising a continuous cooking surface comprising a plurality of individually controllable heating zones, and for each heating zone, a temperature sensor configured to detect a temperature for the heating zone separately from the temperatures of other heating zones, and a heating element disposed beneath the heating zone and configured to provide heat to the heating zone. The cooking system further comprises a controller configured to individually control the heating element of each heating zone.

15 Claims, 5 Drawing Sheets

(51) Int. Cl.
  *F24C 15/10* (2006.01)
  *F24C 7/08* (2006.01)
  *A47J 37/06* (2006.01)
  *A47J 36/32* (2006.01)
(52) U.S. Cl.
  CPC ............ *F24C 7/083* (2013.01); *F24C 15/105* (2013.01); *H05B 2203/003* (2013.01)
(58) Field of Classification Search
  USPC .................................................. 219/448.11
  See application file for complete search history.

(56) References Cited

U.S. PATENT DOCUMENTS

| | | | | |
|---|---|---|---|---|
| 4,511,789 A * | 4/1985 | Goessler | ............... | F24C 15/106 219/448.11 |
| 4,788,414 A * | 11/1988 | Schreder | ............... | F24C 15/102 219/451.1 |
| 5,331,134 A * | 7/1994 | Kimura | .................. | H05B 3/265 219/543 |
| 5,396,047 A * | 3/1995 | Schilling | ............... | F24C 15/106 219/448.11 |
| 7,132,628 B2 * | 11/2006 | Ptasienski | ................ | H05B 3/26 219/543 |
| 2007/0062513 A1 | 3/2007 | Gagas | | |
| 2010/0108661 A1 * | 5/2010 | Vontell | .................... | H05B 3/34 219/477 |
| 2011/0290782 A1 * | 12/2011 | Donarski | ............. | H05B 1/0202 219/443.1 |
| 2012/0074127 A1 | 3/2012 | Abbott | | |
| 2014/0161952 A1 | 6/2014 | Sykes | | |
| 2014/0251980 A1 * | 9/2014 | Lin | ........................ | H05B 6/065 219/624 |
| 2014/0305928 A1 * | 10/2014 | Thompson | ........... | H05B 1/0266 219/448.12 |
| 2015/0082995 A1 | 3/2015 | Broders et al. | | |
| 2015/0257576 A1 | 9/2015 | Yorukoglu et al. | | |
| 2015/0308694 A1 | 10/2015 | Christiansen et al. | | |

FOREIGN PATENT DOCUMENTS

| | | |
|---|---|---|
| EP | 1946685 A1 | 7/2008 |
| JP | 5025698 B2 | 9/2012 |
| WO | 2014203543 A1 | 12/2014 |

OTHER PUBLICATIONS

European Patent Office, Extended European Search Report Issued in Application No. 17748028.2, dated Mar. 14, 2019, Germany, 9 pages.

European Patent Office, Extended European Search Report Issued in Application No. 21217309.0, dated Apr. 13, 2022, Germany, 8 pages.

* cited by examiner

COOKING SYSTEM WITH MULTIPLE HEATING ELEMENTS

CROSS-REFERENCE TO RELATED APPLICATIONS

This application claims the benefit of priority of U.S. Provisional Patent Application Ser. No. 62/289,756, entitled COOKING SYSTEM WITH MULTIPLE HEATING ELEMENTS and filed Feb. 1, 2016, the entire contents of which are hereby incorporated by reference for all purposes.

BACKGROUND

Cooking systems, such as grills, may utilize heating elements to heat a cooking surface for cooking food. Some cooking systems may utilize a continuous cooking surface on which multiple items of food may be cooked at the same time. With such systems, a cook may move food to a center of a heated area of the cooking surface for cooking, and then move the food to the side for maintaining warmth prior to serving.

SUMMARY

Examples are disclosed herein that relate to a cooking system having multiple heating elements for heating a cooking surface. One example provides a cooking system, comprising a continuous cooking surface comprising a plurality of individually controllable heating zones, and for each heating zone, a temperature sensor configured to detect a temperature for the heating zone separately from the temperatures of other heating zones, and a heating element disposed beneath the heating zone and configured to provide heat to the heating zone. The cooking system further comprises a controller configured to individually control the heating element of each heating zone.

DETAILED DESCRIPTION

An electronic cooking system may provide for heating of a cooking surface via a plurality of heating zones, wherein each heating zone includes a respective heating element positioned to provide heat to that zone. Where such a cooking surface utilizes a single temperature feedback location (e.g. a thermocouple positioned in a central location on the cooking surface) for all heating zones, depending on the location and quantity of food products being cooked on the cooking surface, some areas of the cooking surface may become unevenly heated, resulting in inconsistent cooking of the food products. Further, providing heat to all heating zones at a time may result in unnecessary power consumption, such as when only a portion of the cooking surface is being used.

Accordingly, examples are disclosed herein that relate to cooking systems that may provide for more consistent and efficient temperature control across a cooking surface where multiple heating elements are used to heat the surface. For example, the disclosed examples allow each of a plurality of heating zones of the cooking surface to be independently heated to and maintained at a selected temperature set point. As a more specific example, a large, continuous cooking surface, such as a griddle or teppanyaki grill, may include multiple heating zones each having a temperature sensor and separate heating circuit. When food is placed on one heating zone but not another, a temperature drop for that heating zone may be sensed separately from the temperatures of other heating zones. Power then may automatically be applied to that heating zone instead of, or in a higher proportion to, power applied to other heating zones. In this manner, a more uniform temperature may be maintained across the cooking surface with potentially less power usage than where a single temperature sensor and/or single heating circuit is used. It will be appreciated that a single temperature set point may be applied to all heating zones, or different set points may be applied to different heating zones. In either case, appropriate power may be directed to the relevant heating zone to maintain the set temperature for that heating zone.

The disclosed examples also relate to user interfaces for such a cooking system, wherein the user interfaces may present a user with information regarding the temperature of and/or the power being supplied to each heating zone, as well as providing controls for controlling these and other functionalities.

Figure 1:
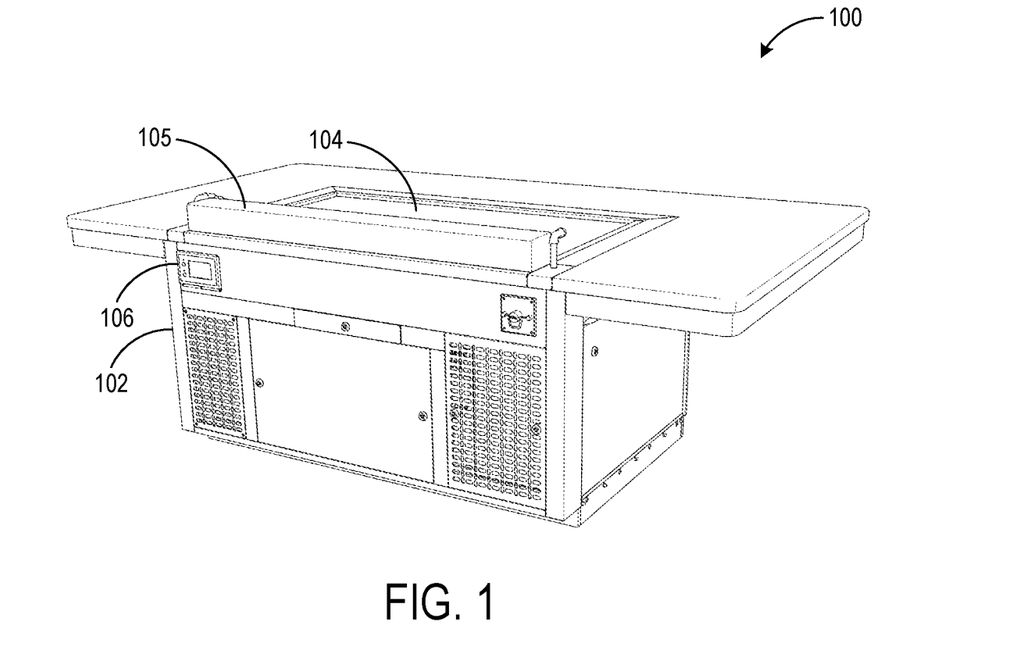
FIG. 1 shows an example cooking system including a control panel.

FIG. 1 shows a rear perspective view of an example cooking system 100. The cooking system 100 includes a body 102 supporting a cooking surface 104, and an air inlet 105 disposed adjacent to the cooking surface 104. The air inlet 105 leads to a conduit in communication with a blower system to pull exhaust air from the cooking surface 104, e.g., for filtering. A user (e.g. a chef) may stand by the rear side of the cooking system 100 (facing the viewer in FIG. 1).

The cooking system further includes a control panel 106 that may be configured to allow control of various functions of the cooking system 100, such as temperatures of heating zones, as well as to provide feedback regarding the operation of the cooking system 100. The heating zones are discussed in greater detail herein with regard to FIG. 2.

Figure 7:
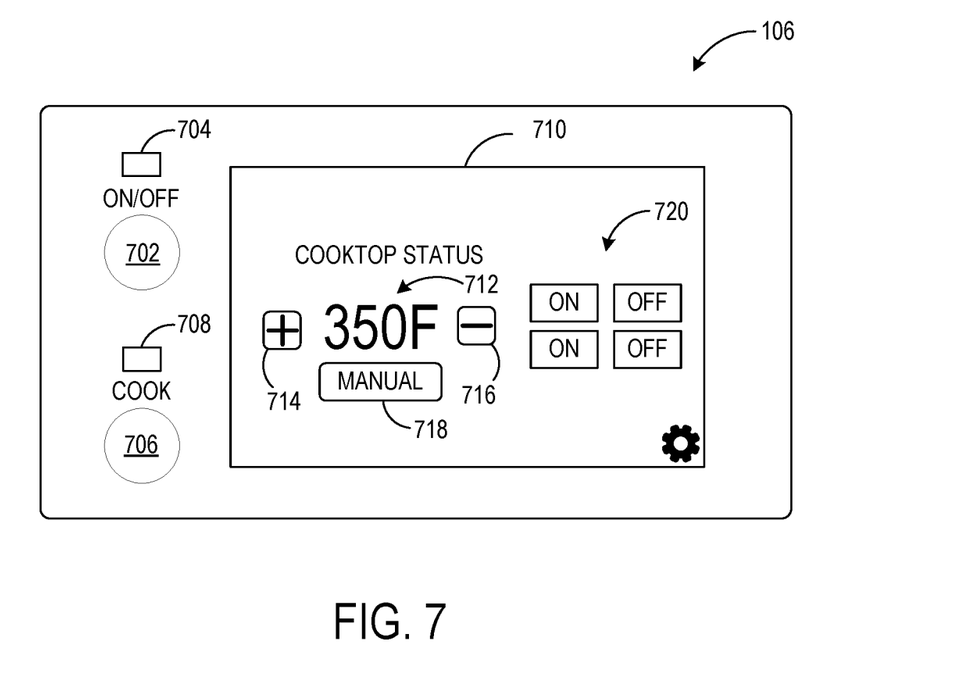
FIG. 7 shows a schematic depiction of an example control panel and user interface for a cooking system.
Figure 8:
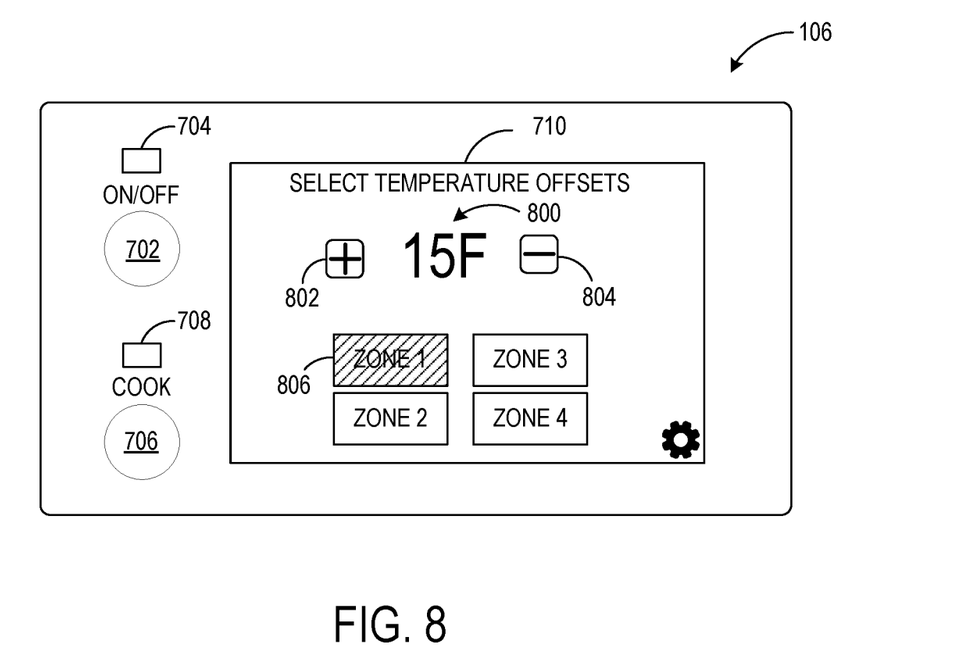
FIG. 8 shows a schematic depiction of another example user interface for a cooking system.

The control panel 106 may be configured to control any suitable aspects of the cooking system 100. For example, the control panel 106 may be configured to allow control of the temperature of the cooking surface, either as a whole or separately for each heating zone. FIG. 7 shows an example configuration of control panel 106 including an example graphical user interface 710. Control panel 106 includes a main control button 702 to control an on/off state of the whole cooking system, and a light indicator 704 that may indicate whether the cooking system is on or off. Similarly, control panel 106 also includes a cooktop control button to control an on/off state of the cooking surface, and a corresponding light indicator 708 for the cooking surface. The control panel also may be configured to provide visual feedback via graphical user interface 710, for example, to show an overall temperature of the cooking surface, at 712, as well as to show whether power is being applied to each heating zone. As a more specific example, the control panel 106 may include a heater indicator block 720 that depicts an indicator for each heating zone that can indicate (e.g. via illumination of a light, display of an object or text on the graphical user interface, or other suitable indicator) whether power is currently being applied to that heating zone. For example, FIG. 7 shows a state in which front and back left-hand side cooking elements are ON, and front and back right-side cooking elements are OFF. In other examples, the heating indicator block 720 may show a current temperature of each heating zone, and further may allow selection of each heating zone to individually set a temperature for each heating zone, as indicated in FIG. 8, which shows a control that allows offsets from a selected cooking temperature to be set for each of four heating zones. For example, the temperature offset 800 may be changed to a higher relative temperature, at 802, or a lower relative temperature, at 804, for a currently selected heating zone 806.

The control panel also may provide warnings or alerts. For example, the control panel may display alerts regarding the cooking surface exceeding a threshold temperature, low airflow through the ventilation system, components that are not operating properly, maintenance warnings (e.g. when scheduled or unscheduled maintenance may be required), etc. The control panel 106 may further be configured to allow monitoring of other cooking system components. For example, the control panel 106 may allow control and monitoring of air filtration system sensor(s) included in the cooking system 100, such as airflow measurements, the absence/presence of air filtration sensors, information regarding the performance of an electrostatic precipitator and/or other filtration system components.

The control panel 106 may utilize any suitable user input devices to allow control of the cooking system 100, including but not limited to buttons, knobs, and one or more touch sensitive displays. In the example of FIG. 7, graphical user interface 710 may be implemented as a touch sensitive display, which provides various controls to control a temperature for the cooktop, such as temperature increase, at 714, temperature decrease, at 716, and a manually set temperature option, at 718. As mentioned above, such controls may also be provided for each individual heating zone. Any other suitable user interface elements, indicators, and control inputs, may be present on the control panel 106. Likewise, the control panel 106 may include any suitable display devices, including but not limited to light-emitting diodes, liquid crystal displays, and organic light emitting devices.

Figure 2:
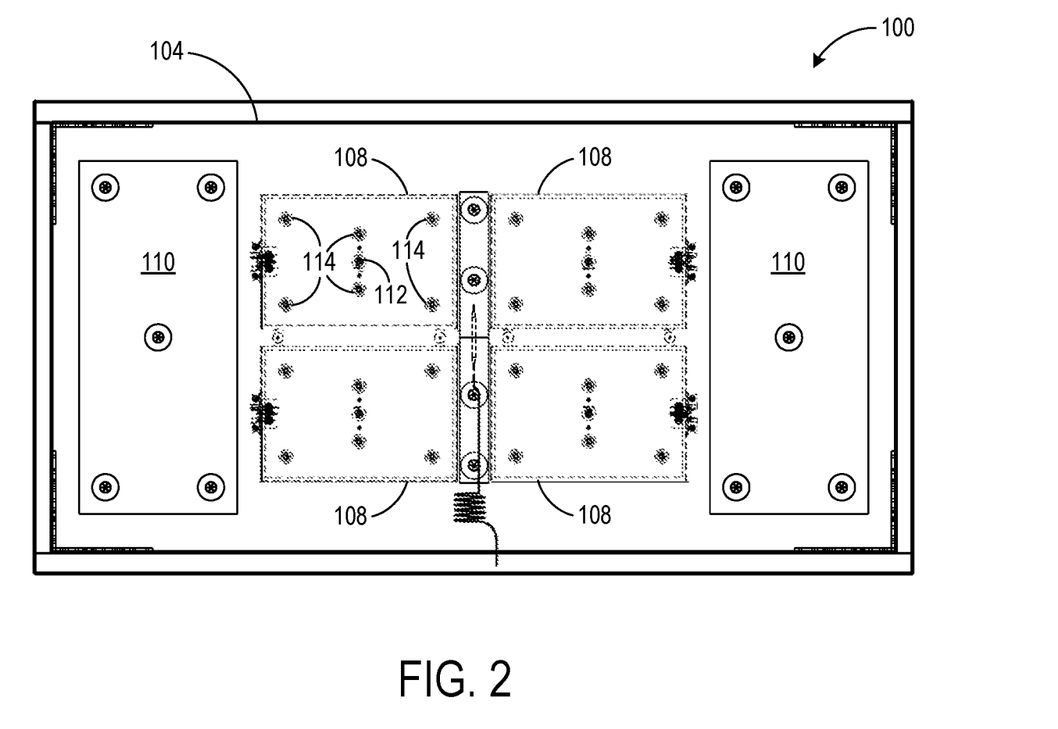
FIG. 2 schematically illustrates an example heater layout positioned under a cooking surface of the cooking system.

FIG. 2 shows a schematic layout of an example configuration of heating elements positioned beneath a respective area of the cooking surface 104. The area under which a heating element is located also is referred to herein as a heating zone. As shown, four primary heating elements 108 are positioned underneath a central area of the cooking surface 104, and two secondary heating elements 110 are positioned to the side of the primary heating elements 108, e.g. closer to a perimeter of the cooking surface 104 and relatively farther from a center of the cooking surface than the primary heating elements. In other examples, different numbers of and/or arrangements of primary and/or secondary heating elements may be used. Further, in some examples, secondary heating elements may be omitted.

Each primary heating element 108 includes a center hole 112 for accommodating a temperature sensor for monitoring cooking surface temperature, and six additional holes 114 for accommodating bolts used to bolt the heating element 108 to an underside of the cooking surface 104. In other examples, any other suitable number of holes for the temperature sensor (or sensors) and fasteners may be positioned in any other suitable arrangement on the heating element.

The primary heating elements 108 provide heat to heating zones in the central cooking area of the cooking surface 104, while the secondary heating elements 110 may serve as carryover heaters to help increase a temperature of the central cooking area more rapidly during heating. The heating zones heated by the secondary heating elements 110 also may be used as an additional cooking area, or as a warming area to maintain a temperature of cooked food products. It will be understood that the heater layout of FIG. 2 is presented for example, and any other suitable layout and number of heating elements may be utilized.

As mentioned, the control panel 106 may provide for individual control of each heating element 108 to maintain a desired temperature. The cooking system 100 may include a controller (e.g. incorporated into the control panel or located elsewhere) configured to control the heating elements based upon a temperature set point for the cooking surface 104 and the temperature measured at each heating zone by a temperature sensor for that temperature zone. As one example, when all four primary heating zones are at the temperature set point and then food is placed on one of the heating zones, a sensed temperature of that heating zone compared to the others may decrease. In response to detecting the temperature of the single heating zone as being below the set point, the controller may be configured to automatically provide more power as needed to the heating element 108 for that heating zone to maintain the temperature of that heating zone at the set point, while applying less power to the other heating zones. The power may be increased by increasing a duty cycle of the heating element in the heating zone being used for cooking, or in any other suitable manner.

Power can be varied between the heating elements in other instances as well. For example, during initial heat-up and during temperature maintenance when no cooking is being performed, power can be shifted between heating elements in a pattern, such that only a subset of heating elements are powered at any time, but also such that the entire cooking surface is heated efficiently. As a more specific example, alternating power pulses may be supplied to two of the four heating elements 108 at a time during warm-up from a cold start. For instance, the left two heating elements 108 depicted in FIG. 2 may be active whenever the right two heating elements 108 are inactive, and the right two heating elements 108 may be active whenever the left two heating elements 108 are inactive. The alternating power supply may be controlled by a variable-current, solid state relay for each heating element. In some examples, each solid state relay may be mounted to an exterior surface of a cooling duct that leads from the air inlet 105 to a cooling system. In other examples, any other suitable pattern of power may be applied to the heating elements. The time intervals for supplying power alternately or cyclically to each heating element 108 may be selected and/or adjusted to maintain the heating elements 108 at desired temperatures, which may be the same or different for different heating elements. In other examples, power may be provided to the multiple heating elements 108 in parallel as needed.

As mentioned above, the control panel 106 may be configured to present information regarding which heating elements 108, and optionally heating elements 110, are currently being powered. As one non-limiting example, where the control panel 16 includes a graphical user interface, heater indicators may be displayed in the form of blocks, each block representing a heating element 108. An inactive heating element 108 may be represented by a first appearance (e.g. an outlined, uncolored block), and an active heating element 108 may be represented by a second appearance (e.g. a red colored block). In other examples, any other suitable user interface objects may be used to indicate a powered and unpowered heating element 108. Further, in other examples, the heater indicators may take any other suitable form than graphical user interface objects, such as a set of lights, where illumination and/or illuminated colors of each light indicates whether power is currently being applied to a corresponding heating element.

The control panel also may be configured to present additional information regarding each heating zone, such as the sensed temperature of the heating zone, the amount of power being applied to the heating zone, a warning status regarding exceeding of a threshold temperature, and/or malfunctioning of a heating element for a heating zone. The control panel may allow a user to manually adjust heating parameters and other operational parameters via a user interface. In this manner, the control panel 106 may provide a user with real-time information about the status of each heating zone of the cooking surface 104 and allow the user to adjust temperature parameters of each heating zone as desired.

Figure 3:
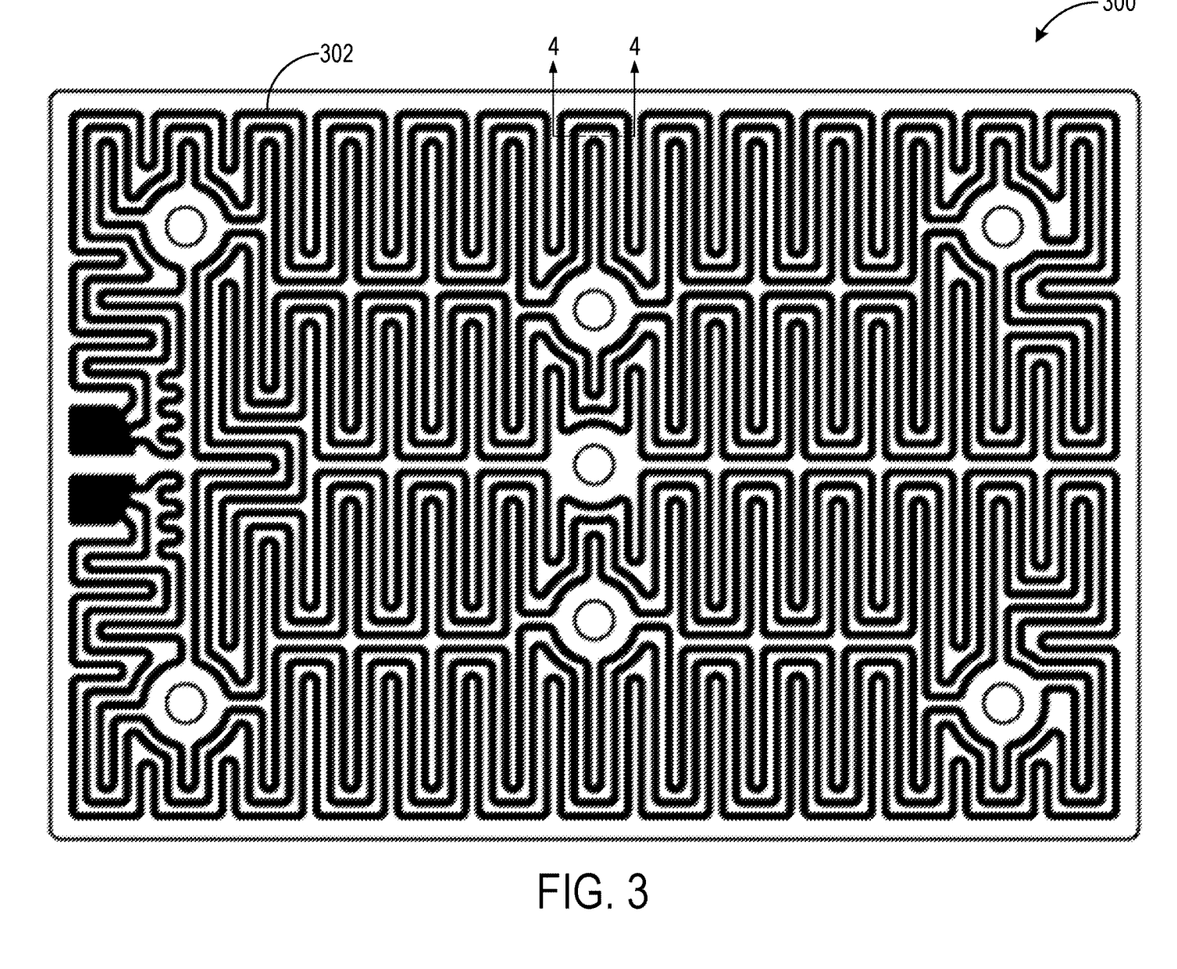
FIG. 3 shows a schematic depiction of a layout of an example heating element.

FIG. 3 schematically illustrates an example heating element circuit 300. The depicted heating element circuit comprises a plurality of conductive paths 302 formed, for example, from an etched foil of a resistive heating material, such as a nickel chromium alloy. The conductive paths may have any suitable arrangement for heating a desired heating surface. Further, the resistive heating material may be positioned within any suitable electrically insulating structure. In some examples, the resistive heating material may be positioned between two layers of a thin electrical insulator, such as thin sheets of mica. In other examples, a heating element circuit may be formed from a printed material, from discrete wires, or from any other suitable resistive heating material.

Figure 4:
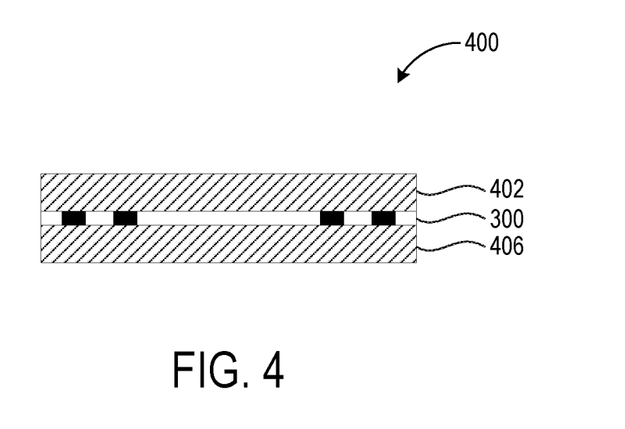
FIG. 4 shows a schematic sectional view of an example heating element assembly.

FIG. 4 shows an example of a heating element assembly 400 comprising heating element circuit 300. Heating element assembly 400 is suitable for use as each primary heating element 108 and/or each secondary heating element 110. Heating element assembly 400 includes an insulating layer 402, heating element circuit 300, and a second insulating layer 406. In other examples, the heating element assembly 400 may utilize a heating element circuit other than heating element circuit 300 and/or electrically insulating layers other than mica. The heating element assembly 400 may be coupled to the cooking surface 104 to help increase conductive heat transfer to the cooking surface 104. Further, in some examples the heating element assembly 300 may be provided in an outer housing as a cartridge, which may then be bolted or otherwise fastened to an underside of the cooking surface 104, as described in more detail in regard to FIG. 6. It will be understood that FIG. 4 may not be drawn to scale, and that the depicted layer thicknesses in the heating element assembly 400 may be exaggerated for clarity.

Figure 5:
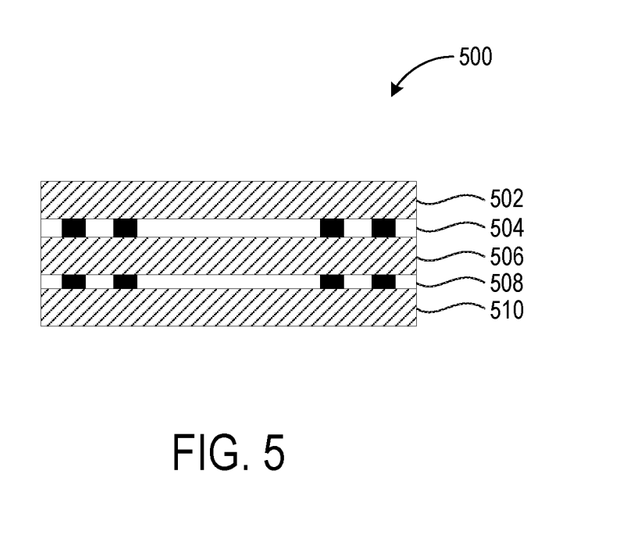
FIG. 5 shows a schematic sectional view of another example heating element assembly.

FIG. 5 shows another example heating element assembly 500 suitable for use as each of heating elements 108 and/or each of secondary heating elements 110. Heating element assembly 500 includes a first insulating layer 502, a first heating element circuit 504, a second insulating layer 506, a second heating element circuit 508, and a third insulating layer 510. In this configuration, the first and second heating element circuits 504, 508 may be configured to provide heat of different power densities. For example, the first heating element circuit 504 may have a higher power density of 7.6 Watts/cm2, while the second heating element circuit 508 may have a lower power density of 6.4 Watts/cm$^2$. In such a configuration, the first heating element circuit 504 may act as a higher-wattage "ramping" heater to quickly ramp up the cooking surface temperature in the heating zone located above the heating element assembly 500, while the second heating element circuit 508 may act as a lower-wattage "maintenance" heater to help maintain the heating zone temperature, e.g. at a set point. Such control of the heating element assembly 500 may allow greater power to be applied to the "ramping" heater 504 when needed, and rely on the "maintenance" heater to maintain a desired temperature while conserving power. In other examples, the controller may be configured to alternately supply power to the first heating element circuit 304 for a first amount of time, and to the second heating element circuit 508 for a second amount of time, in a cyclical, serial manner. In this manner, the two heating element circuits of each heating element assembly may be powered without exceeding a desired total power consumption (e.g. 4650 watts). The relative time durations at which power is supplied to each heating element circuit may be varied based upon any suitable factors, such as the desired temperatures for each heater and/or for the heating zone, as well as other operating variables. It will be understood that any other suitable number of heating element circuits than two may be utilized in each heating element assembly.

Figure 6:
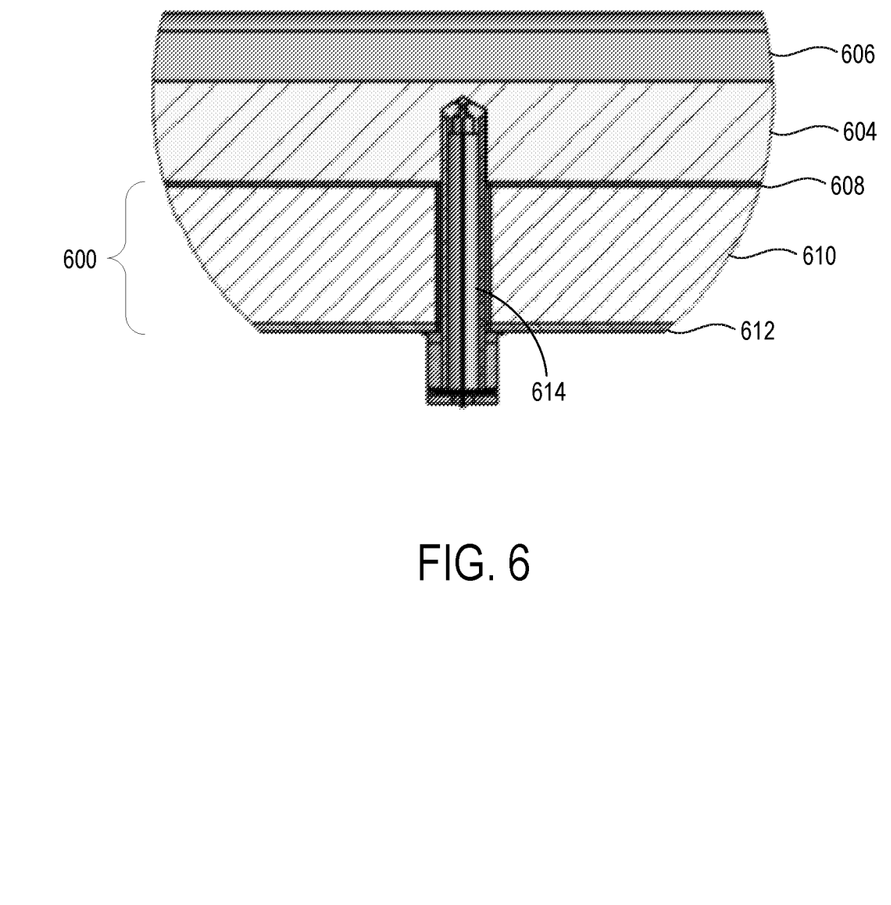
FIG. 6 shows a schematic sectional view of an example heating element cartridge disposed in a cooking system.

FIG. 6 shows an example heating element cartridge 600 that may include the heating element assemblies of FIG. 4 and/or FIG. 5. FIG. 6 also illustrates the placement of the heating element cartridge 600 in a cooking system, such as cooking system 100. As shown, the heating element cartridge 600 is positioned underneath a cooking surface 604 and its surrounding perimeter 606. The heating element cartridge 600 includes a heating element assembly 608, which may be either of the heating element assemblies of FIG. 4 and FIG. 5, or any other suitable heating element assembly. The heating element cartridge 600 also includes a refractory material 610, such as a refractory brick or plate, and a bottom housing layer 612, such as a metal sheet (e.g. electrogalvanized steel). The heating element cartridge 600 may be secured to the cooking surface 604 via threaded studs positioned through the heating element cartridge 600 and welded to the cooking surface 604, or in any other suitable manner.

FIG. 6 also shows a temperature sensor 614 that may be mounted to or integrated with the cooking surface 604 to measure the cooking surface temperature. In the example shown in FIG. 6, the temperature sensor 614 may extend through a hole provided in the heating element cartridge 600 and partially extend through a hole provided in the cooking surface 604 to contact the cooking surface 604. As mentioned above, a temperature sensor may be positioned through each heating element 108 in the cooking system 100 to allow individual control of each heating element. As described above, signals from the temperature sensors may be sent to the temperature controller to allow control of the cooking surface temperature based on the measured temperatures. Further, the sensed temperatures for each heating zone (e.g., the area of the cooking surface 104 disposed above a heating element 108) may be displayed to a user via the control panel 106, thus informing the user of a current temperature of each heating zone.

It will be appreciated that a heating elements, heating element assemblies, and/or heating element cartridge as according to the present disclosure disclosed herein may have any other suitable shapes that a flat or rectangular configuration, and may be used for any other suitable cooking surface shapes than a flat cooking surface. For example, such components may be formed to have a shape that is non-planar, such as convex, concave, etc. As another example, these elements may be formed to conform to a shape of a vessel, such as a kettle (e.g. a steam kettle, beer kettle, etc.). In such an example, a refractory brick as described herein may be formed in the shape of such a vessel to compress a heating element against the vessel. Any of these examples may include one-layer or multi-layer heating elements, as described above.

Another example provides an electronic cooking system, comprising a continuous cooking surface comprising a plurality of individually controllable heating zones, for each heating zone, a temperature sensor configured to detect a temperature for the heating zone separately from the temperatures of other heating zones, and a heating element disposed beneath the heating zone and configured to provide heat to the heating zone, and a controller configured to individually control the heating element of each heating zone. The controller may additionally or alternatively be configured to maintain the temperature of each heating zone at a set temperature by individually controlling an amount of power provided to each heating element based upon a sensed temperature of the heating zone. The electronic cooking system may additionally or alternatively include a user interface configured to present information regarding a temperature of each heating zone and information regarding power currently being applied to each heating zone. The plurality of heating zones may additionally or alternatively include one or more primary heating zones positioned relatively closer to a center of the cooking surface, each primary heating zone having a corresponding primary heating element, and one or more secondary heating zones positioned relatively farther from the center of the cooking surface, each secondary heating zone having a corresponding secondary heating element, and the controller may be configured to vary a temperature of the cooking surface by operating each of the primary heating elements differently than each of the secondary heating elements. The temperature sensor for each heating zone may additionally or alternatively extend through an opening in the heating element for that heating zone and contacts an underside of the cooking surface. Each heating element may additionally or alternatively include an assembly having one or more resistive circuits positioned between insulating layers. The assembly may additionally or alternatively include a first resistive circuit configured to output a higher power density and a second resistive circuit configured to output a lower power density, the second resistive circuit being positioned below the first resistive circuit and separated from the first resistive circuit by an insulating layer. The controller may additionally or alternatively be configured to supply power to the first resistive circuit for a first amount of time and supply power to the second resistive circuit for a second amount of time that is different than the first amount of time. Each heating element may additionally or alternatively be housed in a cartridge comprising a refractory material positioned below the heating element and a housing layer beneath the refractory material relative to the cooking surface. The heating elements may additionally or alternatively be bolted to an underside of the cooking surface.

Another example provides an electronic cooking system, comprising a continuous cooking surface comprising a plurality of individually controllable heating zones, for each heating zone, a temperature sensor configured to detect a temperature for the heating zone separately from the temperatures of other heating zones, and a heating element disposed beneath the heating zone and configured to provide heat to the heating zone, and a controller configured to individually control the heating element of each heating zone to maintain the temperature of each heating zone at a set temperature by controlling an amount of power provided to each heating element based upon a sensed temperature of each corresponding heating zone. The electronic cooking system may additionally or alternatively include a user interface configured to present information regarding a temperature of each heating zone and information regarding power currently being applied to each heating zone. The plurality of heating zones may additionally or alternatively include one or more primary heating zones positioned relatively closer to a center of the cooking surface, each primary heating zone having a corresponding primary heating element, and one or more secondary heating zones positioned relatively farther from the center of the cooking surface, each secondary heating zone having a corresponding secondary heating element, and wherein the controller is configured to vary a temperature of the cooking surface by operating each of the primary heating elements differently than each of the secondary heating elements. The temperature sensor for each heating zone may additionally or alternatively extend through an opening in the heating element for that heating zone and contacts an underside of the cooking surface. Each heating element may additionally or alternatively include a first resistive circuit configured to output a higher power density and a second resistive circuit configured to output a lower power density, the second resistive circuit being positioned below the first resistive circuit and separated from the first resistive circuit by an insulating layer. The controller may additionally or alternatively be configured to supply power to the first resistive circuit for a first amount of time and supply power to the second resistive circuit for a second amount of time that is different than the first amount of time. Each heating element may additionally or alternatively be housed in a cartridge comprising a refractory material positioned below the heating element and a housing layer beneath the refractory material relative to the cooking surface.

Another example provides an electronic cooking system, comprising a continuous cooking surface comprising a plurality of individually controllable heating zones comprising one or more primary heating zones positioned near a central area of the cooking surface and one or more secondary heating zones positioned near a perimeter of the cooking surface, for each heating zone, a temperature sensor configured to detect a temperature for the heating zone separately from the temperatures of other heating zones, a primary heating element disposed beneath each primary heating zone and configured to provide heat to the primary heating zone, a secondary heating element disposed beneath each secondary heating zone and configured to provide heat to the secondary heating zone, and a controller configured to individually control the temperature of each heating zone by controlling an amount of power provided to each heating element based upon a sensed temperature of the heating zone, the controller also being configured to control a temperature variation across the cooking surface by operating each of the primary heating elements differently than each of the secondary heating elements. Each heating element may additionally or alternatively include a first resistive circuit configured to output a higher power density and a second resistive circuit configured to output a lower power density, the second resistive circuit being positioned below the first resistive circuit and separated from the first resistive circuit by an insulating layer. The controller may additionally or alternatively be configured to supply power to the first resistive circuit for a first amount of time and supply power to the second resistive circuit for a second amount of time that is different than the first amount of time.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic cooking system, comprising:
    a continuous cooking surface comprising a plurality of individually controllable heating zones;
    for each heating zone,
        a temperature sensor configured to detect a temperature for the heating zone separately from the temperatures of other heating zones, and
        a heating element disposed beneath the heating zone and configured to provide heat to the heating zone, wherein the heating element comprises a first resistive circuit configured to output a higher power density and a second resistive circuit configured to output a lower power density, the second resistive circuit being positioned directly vertically beneath the first resistive circuit and separated from the first resistive circuit by an insulating layer, wherein each space between adjacent portions of the second resistive circuit is positioned directly vertically beneath a corresponding space between adjacent portions of the first resistive circuit; and
    a controller configured to individually control the heating element of each heating zone, and further configured to, in response to a detected temperature below a temperature set point, supply power to the first resistive circuit during ramping heating stage and supply power to the second resistive circuit after reaching the temperature set point, such that supplying power to the first resistive circuit and the second resistive circuit does not exceed a predetermined total power consumption.

2. The electronic cooking system of claim 1, wherein the controller is configured to maintain the temperature of each heating zone at the temperature set point by individually controlling an amount of power provided to each heating element based upon a sensed temperature of the heating zone.

3. The electronic cooking system of claim 1, further comprising a user interface configured to present information regarding a temperature of each heating zone and information regarding power currently being applied to each heating zone.

4. The electronic cooking system of claim 1, wherein the plurality of heating zones comprises one or more primary heating zones positioned relatively closer to a center of the cooking surface, each primary heating zone having a corresponding primary heating element, and one or more secondary heating zones positioned relatively farther from the center of the cooking surface, each secondary heating zone having a corresponding secondary heating element, and wherein the controller is configured to vary a temperature of the cooking surface by operating each of the primary heating elements differently than each of the secondary heating elements.

5. The electronic cooking system of claim 1, wherein the temperature sensor for each heating zone extends through an opening in the heating element for that heating zone and contacts an underside of the cooking surface.

6. The electronic cooking system of claim 1, wherein the controller is configured to supply power to the first resistive circuit for a first amount of time and supply power to the second resistive circuit for a second amount of time that is different than the first amount of time.

7. The electronic cooking system of claim 1, wherein each heating element is housed in a cartridge comprising a refractory material positioned below the heating element and a housing layer beneath the refractory material relative to the cooking surface.

8. The electronic cooking system of claim 1, wherein the heating elements are bolted to an underside of the cooking surface.

9. An electronic cooking system, comprising:
    a continuous cooking surface comprising a plurality of individually controllable heating zones;
    for each heating zone,
        a temperature sensor configured to detect a temperature for the heating zone separately from the temperatures of other heating zones, and
        a heating element disposed beneath the heating zone and configured to provide heat to the heating zone, wherein the heating element comprises a first resistive circuit configured to output a higher power density and a second resistive circuit configured to output a lower power density, the second resistive circuit being positioned directly vertically beneath the first resistive circuit and separated from the first resistive circuit by an insulating layer, wherein each space between adjacent portions of the second resistive circuit is positioned directly vertically beneath a corresponding space between adjacent portions of the first resistive circuit; and
    a controller configured to individually control the heating element of each heating zone to, in response to a detected temperature below a temperature set point, maintain the temperature of each heating zone at the temperature set point by cyclically and serially supplying power to the first resistive circuit for a first amount of time and supplying power to the second resistive circuit for a second amount of time that is different than the first amount of time based upon a sensed temperature of each corresponding heating zone, such that supplying power to the first resistive circuit and to the second resistive circuit does not exceed a predetermined total power consumption.

10. The electronic cooking system of claim 9, further comprising a user interface configured to present information regarding a temperature of each heating zone and information regarding power currently being applied to each heating zone.

11. The electronic cooking system of claim 9, wherein the plurality of heating zones comprises one or more primary heating zones positioned relatively closer to a center of the cooking surface, each primary heating zone having a corresponding primary heating element, and one or more secondary heating zones positioned relatively farther from the center of the cooking surface, each secondary heating zone having a corresponding secondary heating element, and wherein the controller is configured to vary a temperature of the cooking surface by operating each of the primary heating elements differently than each of the secondary heating elements.

12. The electronic cooking system of claim 9, wherein the temperature sensor for each heating zone extends through an opening in the heating element for that heating zone and contacts an underside of the cooking surface.

13. The electronic cooking system of claim 9, wherein each heating element is housed in a cartridge comprising a refractory material positioned below the heating element and a housing layer beneath the refractory material relative to the cooking surface.

14. An electronic cooking system, comprising:
a continuous cooking surface comprising a plurality of individually controllable heating zones comprising one or more primary heating zones positioned near a central area of the cooking surface and one or more secondary heating zones positioned near a perimeter of the cooking surface;
for each heating zone, a temperature sensor configured to detect a temperature for the heating zone separately from the temperatures of other heating zones;
a primary heating element disposed beneath each primary heating zone and configured to provide heat to the primary heating zone, wherein the primary heating element comprises a first resistive circuit configured to output a higher power density and a second resistive circuit configured to output a lower power density, the second resistive circuit being positioned directly vertically beneath the first resistive circuit and separated from the first resistive circuit by an insulating layer, wherein each space between adjacent portions of the second resistive circuit is positioned directly vertically beneath a corresponding space between adjacent portions of the first resistive circuit;
a secondary heating element disposed beneath each secondary heating zone and configured to provide heat to the secondary heating zone; and
a controller configured to individually control the temperature of each heating zone by controlling an amount of power provided to each heating element based upon a sensed temperature of the heating zone, the controller also being configured to control a temperature variation across the cooking surface by operating each of the primary heating elements differently than each of the secondary heating elements, and the controller being further configured to, in response to a detected temperature below a temperature set point, supply power to the first resistive circuit during ramping heating stage and supply power to the second resistive circuit after reaching the temperature set point, such that supplying power to the first resistive circuit and the second resistive circuit does not exceed a predetermined total power consumption.

15. The electronic cooking system of claim 14, wherein the controller is further configured to supply power to the first resistive circuit for a first amount of time and supply power to the second resistive circuit for a second amount of time that is different than the first amount of time.

* * * * *